(12) United States Patent
Dejneka et al.

(10) Patent No.: US 9,290,413 B2
(45) Date of Patent: Mar. 22, 2016

(54) ION EXCHANGEABLE GLASS WITH HIGH COMPRESSIVE STRESS

(75) Inventors: Matthew John Dejneka, Corning, NY (US); Adam James Ellison, Painted Post, NY (US); John Christopher Mauro, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 481 days.

(21) Appl. No.: 13/533,298

(22) Filed: Jun. 26, 2012

(65) Prior Publication Data

US 2013/0004758 A1    Jan. 3, 2013

Related U.S. Application Data

(60) Provisional application No. 61/503,734, filed on Jul. 1, 2011.

(51) Int. Cl.
| | | |
|---|---|---|
| *C03C 21/00* | (2006.01) | |
| *C03C 3/087* | (2006.01) | |
| *C03C 3/091* | (2006.01) | |
| *C03C 3/093* | (2006.01) | |

(52) U.S. Cl.
CPC .............. *C03C 21/002* (2013.01); *C03C 3/087* (2013.01); *C03C 3/091* (2013.01); *C03C 3/093* (2013.01); *Y10T 428/315* (2015.01)

(58) Field of Classification Search
USPC ........................................................ 428/410
See application file for complete search history.

(56) References Cited

U.S. PATENT DOCUMENTS

| | | | |
|---|---|---|---|
| 4,119,760 A | | 10/1978 | Rinehart |
| 5,846,280 A | * | 12/1998 | Speit ............................ 65/30.14 |
| 5,895,768 A | * | 4/1999 | Speit ........................... 428/846.9 |
| 6,416,235 B1 | | 7/2002 | Rabinovich |
| 7,666,511 B2 | | 2/2010 | Ellison et al. |
| 8,168,295 B2 | | 5/2012 | Murata |
| 2007/0060465 A1 | * | 3/2007 | Varshneya et al. ............. 501/68 |
| 2009/0197088 A1 | | 8/2009 | Murata |
| 2009/0220761 A1 | | 9/2009 | Dejneka et al. |
| 2009/0298669 A1 | | 12/2009 | Akiba et al. |
| 2009/0325776 A1 | | 12/2009 | Murata |
| 2010/0009154 A1 | * | 1/2010 | Allan et al. ................... 428/220 |
| 2010/0047521 A1 | | 2/2010 | Amin et al. |
| 2010/0206008 A1 | | 8/2010 | Harvey et al. |
| 2010/0291353 A1 | * | 11/2010 | Dejneka et al. ............... 428/192 |
| 2011/0014475 A1 | | 1/2011 | Murata |

(Continued)

FOREIGN PATENT DOCUMENTS

| | | | |
|---|---|---|---|
| DE | 3212612 A1 | | 10/1983 |
| WO | WO2008044694 A | * | 4/2008 |
| WO | WO2008108332 A | * | 9/2008 |
| WO | WO2008149858 A | * | 12/2008 |
| WO | WO2009019965 A | * | 2/2009 |

(Continued)

OTHER PUBLICATIONS

U.S. Appl. No. 61/434,033, Murata et al., filed Jan. 19, 2011.*

*Primary Examiner* — David Sample
(74) *Attorney, Agent, or Firm* — Timothy M. Schaeberle

(57) ABSTRACT

An aluminosilicate glass article having a high compressive stress layer. The glass article comprises at least about 50 mol % $SiO_2$ and at least about 11 mol % $Na_2O$, and has a layer under a compressive stress of at least about 900 MPa and the depth of layer that extends at least about 30 μm from the surface of the glass article into the glass. A method of making such a glass article is also provided.

15 Claims, 3 Drawing Sheets

(56) References Cited

U.S. PATENT DOCUMENTS

| | | |
|---|---|---|
| 2011/0071012 A1 | 3/2011 | Kondo et al. |
| 2011/0201490 A1 | 8/2011 | Barefoot et al. |
| 2011/0274916 A1 | 11/2011 | Murata |
| 2011/0294648 A1 | 12/2011 | Chapman et al. |
| 2012/0196110 A1* | 8/2012 | Murata et al. ................. 428/220 |
| 2012/0236526 A1 | 9/2012 | Weber |

FOREIGN PATENT DOCUMENTS

| | | |
|---|---|---|
| WO | WO2011103798 A1 | 1/2011 |
| WO | WO2011103799 A1 | 1/2011 |
| WO | 2011069338 A1 | 6/2011 |
| WO | WO2011144024 A1 | 11/2011 |
| WO | WO2012082528 A2 | 6/2012 |
| WO | WO2012125857 A1 | 9/2012 |

* cited by examiner

200

ION EXCHANGEABLE GLASS WITH HIGH COMPRESSIVE STRESS

CROSS-REFERENCE TO RELATED APPLICATIONS

This application claims the benefit of priority under 35 U.S.C. §119 of U.S. Provisional Application Ser. No. 61/503,734 filed on Jul. 1, 2011, the content of which is relied upon and incorporated herein by reference in its entirety.

BACKGROUND

The disclosure relates to a glass article. More particularly, the disclosure relates to an aluminosilicate glass article having an outer layer under compressive stress.

When used in applications such as displays and cover glasses for electronic devices such as televisions, telephones, and entertainment devices, glass is sometimes strengthened by either thermal or chemical means. Such strengthening typically involves creating a layer at the surface of the glass that is under compression. This layer prevents flaws caused by impact of an object with the glass from propagating into the bulk of the glass, thus causing cracking and/or breakage.

One such means of chemically strengthening glass is ion exchange. Glass undergoes stress relaxation during ion exchange. Such stress relaxation can be mitigated by reducing the temperature at which ion exchange is carried out. However, reducing temperature decreases the rate and the depth to which such exchange takes place to such an extent so as to make such temperature reduction impractical. Annealing the glass prior to ion exchange tends to increase the compressive stress, but it also decreases the rate of ion exchange.

SUMMARY

An aluminosilicate glass article having a high compressive stress layer is provided. The glass article comprises at least about 50 mol % $SiO_2$ and at least about 11 mol % $Na_2O$, and has a layer under a compressive stress of at least about 900 MPa and the depth of layer that extends at least about 30 μm from the surface of the glass article into the glass. A method of making such a glass article is also provided.

Accordingly, one aspect of the disclosure is to provide a glass article having a surface and a layer under compressive stress extending from the surface to a depth of layer. The glass article comprises at least about 50 mol % $SiO_2$ and at least about 11 mol % $Na_2O$. The compressive stress is at least about 900 MPa and the depth of layer is at least about 30 μm.

A second aspect of the disclosure is to provide an aluminosilicate glass comprising $SiO_2$, $Na_2O$, $Al_2O_3$, and at least one of $B_2O_3$, $K_2O$, MgO and ZnO, wherein $-340+27.1 \cdot Al_2O_3-28.7 \cdot B_2O_3+15.6 \cdot Na_2O-61.4 \cdot K_2O+8.1 \cdot (MgO+ZnO) \geq 0$ mol %.

A third aspect of the disclosure is to provide a glass article having a surface and a layer under compressive stress extending from the surface to a depth of layer, wherein the compressive stress is at least about 900 MPa and the depth of layer is at least about 30 μm, and wherein the layer is formed by ion exchanging the glass article in a bath at a temperature of up to about 410° C. for up to about 16 hours.

A fourth aspect of the disclosure is to provide an aluminosilicate glass. The aluminosilicate glass comprises: at least about 50 mol % $SiO_2$; from about 7 mol % to about 26 mol % $Al_2O_3$; from 0 mol % to about 9 mol % $B_2O_3$; from about 11 mol % to about 25 mol % $Na_2O$; from 0 mol % to about 2.5 mol % $K_2O$; from 0 mol % to about 8.5 mol % MgO; and from 0 mol % to about 1.5 mol % CaO, wherein $-340+27.1 \cdot Al_2O_3-28.7 \cdot B_2O_3+15.6 \cdot Na_2O-61.4 \cdot K_2O+8.1 \cdot (MgO+ZnO) \geq 0$ mol %.

A fifth aspect of the disclosure is to provide a method of making a glass article having a layer under compressive stress, the layer extending from a surface of the glass article to a depth of layer. The method comprises: providing an aluminosilicate glass article comprising at least about 50 mol % SiO2 and at least about 11 mol % Na2O; and ion exchanging the aluminosilicate glass article in a bath at a temperature of up to about 410° C. for up to about 16 hours to form the layer, wherein the layer is under a compressive stress of at least about 900 MPa and the depth of layer is at least about 30 μm.

These and other aspects, advantages, and salient features will become apparent from the following detailed description, the accompanying drawings, and the appended claims.

DETAILED DESCRIPTION

Figure 1:
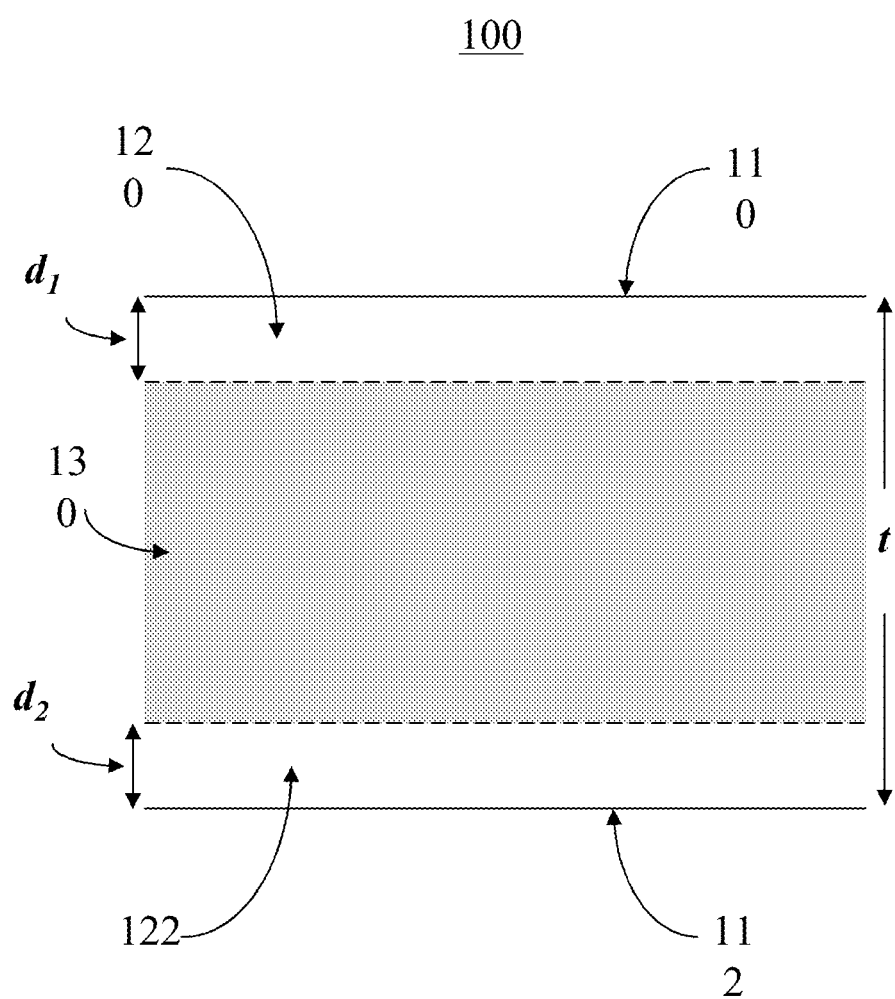
FIG. 1 is a cross-sectional schematic view of a glass article.

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range as well as any ranges therebetween. As used herein, the indefinite articles "a," "an," and the corresponding definite article "the" mean "at least one" or "one or more," unless otherwise specified.

Referring to the drawings in general and to FIG. 1 in particular, it will be understood that the illustrations are for the purpose of describing particular embodiments and are not intended to limit the disclosure or appended claims thereto. The drawings are not necessarily to scale, and certain features and certain views of the drawings may be shown exaggerated in scale or in schematic in the interest of clarity and conciseness.

In one embodiment, an aluminosilicate glass article (also referred to herein as a "glass article" or "glass") is provided. The glass article has a layer under compressive stress (also referred to herein as the "compressive layer") extending from a surface of the glass article to a depth of layer in the glass article. The compressive stress (CS) is at least 900 MPa and the depth of layer is at least 30 μm.

A cross-sectional schematic view of the glass article is shown in FIG. 1. Glass article 100 has a thickness t, first surface 110, and second surface 112. Glass article, in some embodiments, has a thickness t of up to about 1 mm. While the embodiment shown in FIG. 1 depicts glass article 100 as a flat planar sheet or plate, glass article may have other configurations, such as three dimensional shapes or non-planar configurations. Glass article 100 has a first compressive layer 120 extending from first surface 110 to a depth of layer $d_1$ into the bulk of the glass article 100. In the embodiment shown in FIG. 1, glass article 100 also has a second compressive layer 122 extending from second surface 112 to a second depth of layer $d_2$. Glass article also has a central region 130 that extends from $d_1$ to $d_2$. Central region 130 is under a tensile stress or central tension (CT), which balances or counteracts the compressive stresses of layers 120 and 122. The 30 μm depth $d_1$, $d_2$ of first and second compressive layers 120, 122 protects the glass article 100 from the propagation of flaws introduced by sharp impact to first and second surfaces 110, 112 of glass article 100, while the compressive stress of at least about 900 MPa minimizes the likelihood of a flaw penetrating through the depth $d_1$, $d_2$ of first and second compressive layers 120, 122.

Figure 2:
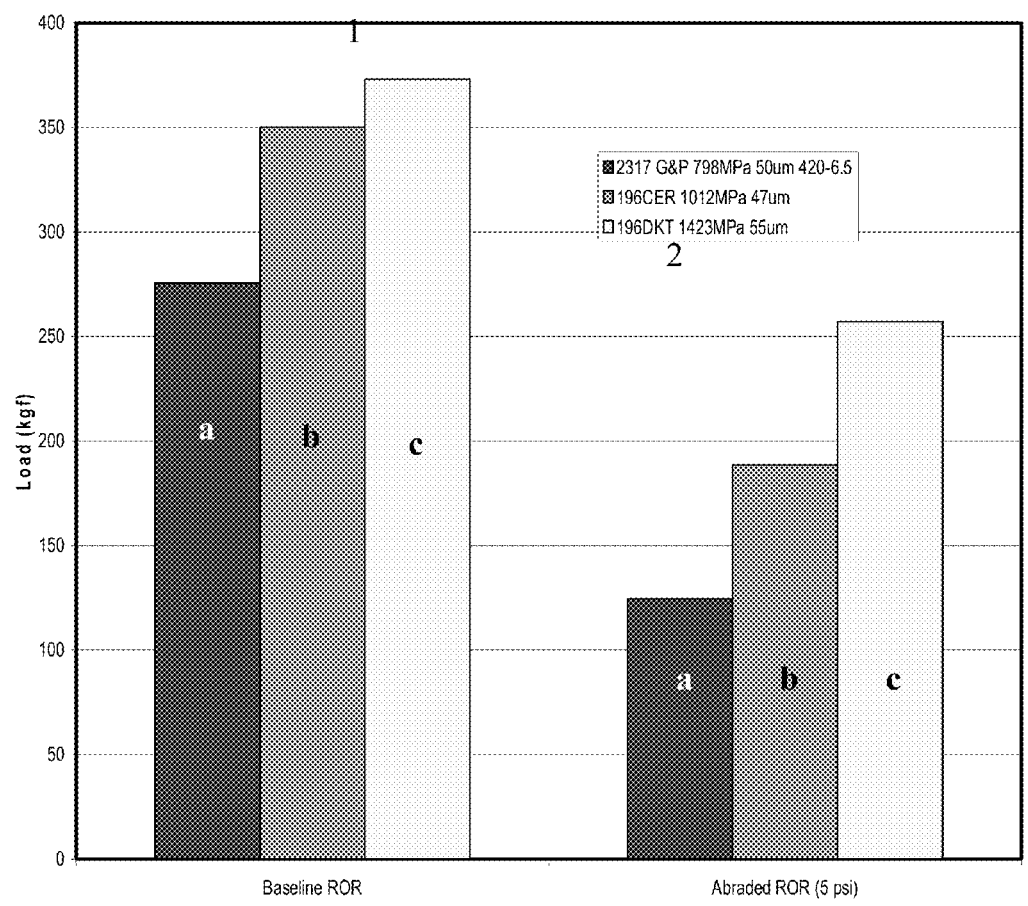
FIG. 2 is a plot of load to failure for a commercially available glass and two of the glasses described herein.

The result of the higher compressive stress of the glasses described herein is greater strength and resistance to damage. The loads to failure measured for 1 mm thick samples of two compositions of the glasses described herein are compared to that of 1 mm thick samples of commercially available glass (Corning 2317 glass) in FIG. 2. The commercially available glass (a in FIG. 2) has a compressive stress of 798 MPa and a depth of layer of 50 μm, whereas the two glasses that are described herein (b and c in FIG. 2) have compressive stresses of 1012 MPa and 1423 MPa and depths of layer of 47 μm and 55 μm, respectively. These higher compressive stress glasses (b and c) exhibit greater loads to failure than the commercially available glass (a) for polished glasses (group 1 in FIG. 2). After abrasion with SiC at 5 psi (group 2), the glass having the highest compressive stress (c) shows a factor of 2 greater load to failure, demonstrating the improved damage resistance and value of the invention.

The compressive layer (or layers) of the glass article may be formed by ion exchanging the glass article. In a particular embodiment, ion exchange is carried out by immersing the glass article in a molten salt bath substantially comprising potassium nitrate (KNO$_3$). The ion exchange bath may also comprise up to about 0.6 mol % and, in some embodiments, up to about 0.2 mol % sodium nitrate (NaNO$_3$). As used herein, the term "substantially comprising" means that other components may be present in the molten salt bath. Such components may include, but are not limited to, compounds that act to reduce attack of the bath vessel or the glass article by the molten salt. Such additional components may include, but are not limited to, selected components of the glass, such as silicic acid, alumina in gel form, silica in gel form, or the like.

The temperature of the molten salt bath in which the aluminosilicate glass article described herein is immersed is less than or equal to about 420° C., in other embodiments, less than or equal to about 415° C., and, is still other embodiments, less than about 410° C. This temperature may be determined, for example, by embedding or otherwise containing a suitable thermocouple within an electrically insulating sheath and submerging the thermocouple in the molten salt bath at a depth roughly corresponding to the depth at which the glass article will be immersed during the ion exchange process. The glass article is immersed in the KNO$_3$ ion exchange bath for a time period of up to, in some embodiments, about eight hours. In other embodiments, the glass article is immersed in the KNO$_3$ ion exchange bath for a time period of up to about 16 hours.

The process of annealing a glass causes the rate of ion exchange of the glass article to increase while causing the compressive stress of the compressive layer to increase. Due to the increase in ion exchange time, however, it is often impractical to take advantage of such an annealing process. In addition, ion exchange at lower temperatures reduces the rate of stress relaxation of the ion exchanged glass, thereby increasing the compressive stress in the glass article. However, ion exchange at lower temperature decreases the rate of ion exchange, thus making it impractical to carry out ion exchange at lower temperature due to the long times required to ion exchange the glass to a desired depth of layer.

In some embodiments, the aluminosilicate glass described herein is annealed prior to ion exchange. Unless otherwise specified, "anneal" means holding the glass a temperature that is between the strain point and glass transition temperature Tg of the glass for a period of up to about two hours and then cooled at a rate of up to about 1° C./minute to room temperature (i.e., about 25° C.). Alternatively, the aluminosilicate glass may be rapidly cooled (i.e., at a rate of at least about 4° C./second) from a high temperature to a temperature below the strain point of the glass or directly to room temperature. Such rapid cooling may occur when the glass is formed by a down draw process such as slot or fusion draw processes. The aluminosilicate glass article is typically heated to a first temperature that is greater than, the anneal point of the glass to increase the volume of the glass, and then quenched to a second temperature that is less than the strain point of the glass. In one embodiment in which the glass article is molten, the melt is heated to a temperature that is greater than the anneal point and quenched by down-drawing the glass using, for example, slot-draw or fusion-draw processes, to form a sheet. In other embodiments, a solid glass article is heated to a temperature above the anneal point of the glass and then quenched to a temperature below the strain point of the glass.

The aluminosilicate glass article described herein comprises at least about 50 mol % SiO$_2$ and at least about 11 mol % Na$_2$O. In some embodiments, the glass article comprises: from about 7 mol % to about 26 mol % Al$_2$O$_3$; from 0 mol % to about 9 mol % B$_2$O$_3$; from about 11 mol % to about 25 mol % Na$_2$O; from 0 mol % to about 2.5 mol % K$_2$O; from 0 mol % to about 8.5 mol % MgO; and from 0 mol % to about 1.5 mol % CaO. In some embodiments, the aluminosilicate glass article described herein comprises SiO$_2$, Na$_2$O, Al$_2$O$_3$, and at least one of B$_2$O$_3$, K$_2$O, MgO and ZnO), wherein Na$_2$O+Al$_2$O$_3$+MgO+ZnO>25 mol %. The oxides SiO$_2$, Na$_2$O, Al$_2$O$_3$, B$_2$O$_3$, K$_2$O, MgO, and CaO are referred to herein as "major oxides." As glass compositions are represented as oxides, the sum of all oxides present in the glass article must be 100 mol %. The glass article may also include oxides other than the above major oxides to achieve desired effects, such as improved defect levels, reduced liquidus temperature, color, opacity, or the like. In such instances, however, the major oxides should comprise at least 95 mol % of all oxide constituents of the glass; i.e., SiO$_2$+Al$_2$O$_3$+B$_2$O$_3$+Na$_2$O+K$_2$O+MgO+ZnO≥95 mol %.

While may glass compositions may fall within the above composition range, not all such glasses, when ion exchanged or otherwise strengthened under those conditions previously described herein above, will possess a compressive layer with a compressive stress of at least about 900 MPa and a depth of layer of at least about 30 μm. Such compressive stress and depth of layer values are achieved only for those compositions in which the condition $$-340+27.1 \cdot Al_2O_3 - 28.7 \cdot B_2O_3 + 15.6 \cdot Na_2O - 61.4 \cdot K_2O + 8.1 \cdot (MgO+ZnO) \geq 0 \text{ mol \%}, \quad (1)$$

referred to herein as the CS criterion, is met. Not every combination of oxides that lies within the above composition range will satisfy the CS criterion. Those that do not meet the CS criterion of equation (1) will typically show either unacceptably low rates of ion exchange and/or low compressive stress. Examples of glasses having compositions that are within the range previously described herein and satisfy the CS criterion are listed in Table 1.

Each of the major oxide components plays a unique role in the ion exchange properties of the glass article. The coefficients in the CS criterion (equation (1)) represent the approximate impact of diluting the entire glass with a 1 mol % addition of a selected oxide. For example, adding 1 mole of $Al_2O_3$ to 99 moles of the other oxides in the previously described range will result in an annealed glass with a depth of layer of at least 30 μm and an increase in compressive stress of about 27 MPa. However, the actual improvement observed in compressive stress will depend upon the precise constituents in the glass and their complex relationships with one another. Accordingly, a larger or smaller CS increase than that predicted by equation (1) may be obtained in practice.

Of the various oxides in the composition range described hereinabove, $Al_2O_3$ has the largest impact on the CS criterion. Those alkali cations that can do so stabilize $Al^{3+}$ in tetrahedral coordination with oxygen anions, with each of these oxygen anions being shared with silicon. Since silicon donates one electron to each oxygen, the stoichiometry and effective charge of tetrahedrally-coordinated aluminum sharing each of its surrounding oxygens with silicon is $[AlO_{4/2}]^{-1}$. A large +1 cation, such as any of the alkali cations, provides the requisite positive charge to compensate for the otherwise negatively charged coordination configuration of the tetrahedrally-coordinated aluminum. The larger the alkali ion, the weaker is its electrostatic interaction with $[AlO_{4/2}]^{-1}$ "anions," and the more effective is its charge balancing interaction.

Like aluminum, magnesium and zinc can be tetrahedrally coordinated by oxygen, forming $[MgO_{4/2}]^{-2}$ and $[ZnO_{4/2}]^{-2}$ "anions" that are charge-balanced by two alkalis. As with aluminum, the larger the alkali cation, the stronger the Mg—O or Zn—O bonds, and the weaker the alkali-oxygen interaction. Thus, $Al_2O_3$ strongly increases compressive stress, whereas MgO and ZnO increase compressive stress less so. The cation-anion bonds become stronger, and placing a larger potassium ion into a smaller sodium site results in a larger compressive stress than were the potassium ion to replace sodium in a site composed of weaker cation-oxygen bonds.

The CS criterion (equation (1)) also indicates that increasing the $Na_2O$ concentration in the glass article also increases CS. $Na_2O$ is replaced by $K_2O$ during ion exchange. If an incremental increase in $Na_2O$ results in an incremental increase in $K_2O$, then the compressive stress would appear to increase accordingly. However, $Na_2O$ also lowers the viscosity of the glass article. While the viscosity of the glass is high at ion exchange temperatures, it is not so high that appreciable viscous relaxation cannot take place. Thus, increased amounts of $Na_2O$ in the glass may increase relaxation at ion exchange temperatures. To the extent that $Na_2O$ can be accounted for in charge-balancing roles, e.g., $Na+[AlO_{4/2}]^-$ or $[Na+]2[MgO_{4/2}]^{2-}$, increases in the concentrations of these components results in an increase in compressive stress.

In those instances in which both $Na^+$ and $K^+$ are present, the highest compressive stresses are generally obtained when both can be completely accounted for in charge-balancing roles for $Al^{3+}$, $Mg^{2+}$, and $Zn^{2+}$. With this in mind, it may, in some embodiments, be desirable that most of the alkali metal oxides in the glass articles described herein can be accounted for as charge-balancing cations for aluminum, magnesium and zinc; i.e., $$Na_2O+K_2O-Al_2O_3-MgO-ZnO=0. \quad (2)$$

However, $Al_2O_3$, MgO, or ZnO concentrations in excess of those of $Na_2O$ plus $K_2O$ generally do not negatively impact compressive stress, although the rate of ion exchange can be negatively impacted at the highest MgO and ZnO levels. In addition, the relative proportions of Na, K, Al, Mg, and Zn can be varied with respect to one another to improve compressive stress, depth of layer, or both. Glasses having relatively high alumina content can be extremely viscous, however, and melting rates and defect levels in the glass article can adversely impacted. Glasses having MgO high concentrations tend to have high liquidus temperatures, which may interfere with melting, fining, or forming processes.

In the same way that the relative proportions of Na, K, Al, Mg, and Zn oxides may be varied to achieve various ion exchange effects, $B_2O_3$ and CaO may be used in combination with variations in the oxides of the above elements to improve manufacturing attributes. In exploring how these oxides impact ion exchange attributes, we find that excellent combinations of ion exchange properties and manufacturing attributes are obtained when $$-5 \text{ mol \%} \leq Na_2O+K_2O-Al_2O_3-MgO-ZnO \leq 4 \text{ mol \%}. \quad (3)$$

While equation (3), which is referred to as the compensation criterion, is not a necessary condition for the glasses described herein, but may be a factor to consider when designing a glass for a particular melting or forming process. The compensation criterion influences the compressive stress achieved after ion exchange. The highest compressive stresses are generally obtained when the compensation criterion is less than or equal to zero. Examples 1-183, 282, and 283 in Table 1 are exemplary of compositions that satisfy the compensation criterion.

In those instances in which the compensation criterion (equation (3)) is greater than zero, the glasses tend to have lower melting and forming temperatures, and are correspondingly easier to manufacture. If glass melting and forming systems permit, it may be possible to add $Al_2O_3$, MgO, or ZnO to such a composition and thus improve the ion exchange attributes of the glass article. However, the addition of $Al_2O_3$ generally results in increased viscosity, whereas MgO and/or ZnO addition will at some point increase the liquidus temperature of the glass.

The concentrations of $B_2O_3$, $K_2O$, and CaO may be adjusted relative to those of $Na_2O$, $Al_2O_3$, MgO, and ZnO to achieve an appropriate balance of ion exchange and manufacturing attributes. On a mole-for-mole basis, $B_2O_3$ lowers the compressive stress and the rate of ion exchange of the glass article nearly as much as $Al_2O_3$ increases them. However, $B_2O_3$ decreases viscosity more strongly than $Al_2O_3$ increases it. Thus, while the CS criterion (equation (1)) predicts that adding $Al_2O_3$ and $B_2O_3$ on a mole-for-mole basis will have little impact on compressive stress, the viscosity of most glasses will decrease substantially, thus increasing the ease of manufacturing in some processes. In some embodiments, $B_2O_3$ and $Al_2O_3$ may be added in different proportions to fine-tune ion exchange and manufacturing attributes. Examples 186-262 in Table 1 illustrate how the combination of high $Al_2O_3$ and $B_2O_3$ concentrations can be used to obtain CS criterion values of greater than or equal to zero.

As indicated by the coefficient for $K_2O$ in the CS criterion (equation (1)), $K_2O$, when substituted for other glass components, has a very large, negative impact on compressive stress.

On the other hand, K$_2$O has the largest positive impact on the rate of ion exchange of any of the major oxide components. Therefore, the addition of K$_2$O is a very effective means for improving the rate of ion exchange if compressive stress is quite high but the rate of ion exchange is unacceptably low. When substituted for Na$_2$O, however, K$_2$O may cause an increase in viscosity, as K$^+$ is larger than Na$^+$ and hence more effective as a charge-balancing cation and as an amplifier of the strength of Al—O bonds. While B$_2$O$_3$ may be added to compensate for the viscosity increase due to K$_2$O addition, it too will reduce compressive stress, and thus compound the impact of K$_2$O alone. Examples 263-282 in Table 1 illustrate how K$_2$O can be used in combination with other oxides to satisfy the CS criterion in glasses for which the flux criterion is >0.

CaO is to be avoided in general because its impact on the rate of ion exchange is approximately equal and opposite that of K$_2$O. However, the presence of CaO and K$_2$O may be desirable in some cases, particularly in glasses with high MgO concentrations, so as to lower the liquidus temperature and diminish the risk of forming the magnesium silicate mineral forsterite (Mg$_2$SiO$_4$) as a devitrification phase in the melting or forming process.

In addition to the oxides listed hereinabove, the aluminosilicate glasses described herein may contain chemical fining agents such as, but not limited to, halides (salts containing F, Cl, Br and/or I) and the oxides As$_2$O$_3$, Sb$_2$O$_3$, CeO$_2$ and SnO$_2$. These fining agents are generally batched at a level of 0.5 mol % or less, and have minor impact on both the rate of ion exchange and the compressive stress that is ultimately obtained.

Other oxides may be added at low concentrations with little or no impact on the ion exchange characteristics of the aluminosilicate glasses described herein. Non-limiting examples of such oxides include ZrO$_2$ (a common contaminant introduced by zirconia refractories in melters), TiO$_2$ (a common tramp component of natural silica sources), Fe$_2$O$_3$ (an ubiquitous tramp oxide in all but the purest chemical reagents), other transition metal oxides that might be used to introduce color (V$_2$O$_3$, Cr$_2$O$_3$, Co$_3$O$_4$, Fe$_2$O$_3$, etc.), and the like. These oxides are, in some embodiments, present at levels of 0.1 mol % or less.

The impact of larger alkaline earths (Sr and Ba) is comparable to that of calcium. In addition, these alkaline earths are costly reagents compared to most of the other oxides in the aluminosilicate glasses described herein. Consequently, these larger alkaline earth oxides are present in levels that are, in some embodiments, kept below 0.5 mol %.

Rubidium and cesium oxides are too large to ion exchange at an appreciable rate, and are both costly and contribute to high liquidus temperatures at elevated concentrations. These oxides are present in levels that are, in some embodiments, kept below 0.5 mol %.

In some embodiments, the aluminosilicate glass articles described herein are substantially free of lithium oxide (Li$_2$O). As used herein, "substantially free of lithium oxide" means that Li$_2$O is not intentionally batched or otherwise added to the aluminosilicate glass or the ion exchange bath. In some embodiments, the Li$_2$O concentration in the aluminosilicate glass is kept below 0.5 mol %, and, in other embodiments, below 0.1 mol %. Lithium oxide is to be generally avoided because it contributes to "poisoning" of the potassium nitrate salt bath, and thus results in a compressive stress in the glass article that is lower than would be obtained if the same glass were ion exchanged in a lithium-free salt bath. The presence of Li$_2$O also adds cost to the ion exchange process, as the salt must be discarded more frequently to compensate for lithium introduced by the glass.

Figure 3:
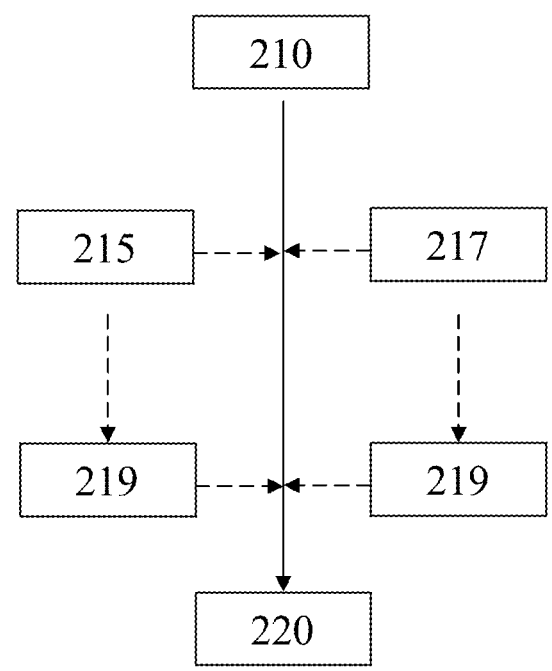
FIG. 3 is a flow chart for a method of making an aluminosilicate glass article.

In another aspect, a method of making a glass article having a compressive layer extending from a surface of the glass article to a depth of layer of at least about 30 µm within the glass article, wherein the compressive layer is under a compressive stress of at least about 900 MPa is also provided. A flow chart describing the method is shown in FIG. 3. Method 200 comprises a first step 210 in which an aluminosilicate glass article, such as those previously described hereinabove, is provided. The aluminosilicate glass article comprises at least about 50 mol % SiO$_2$ and at least about 11 mol % Na$_2$O. In some embodiments, step 210 comprises down drawing the aluminosilicate glass, for example, a slot draw process, a fusion draw process, or the like.

In step 220, the aluminosilicate glass is ion exchanged at a temperature of up to about 410° C. in an ion exchange bath for a time period of up to about eight hours in length to achieve a compressive stress of at least 900 MPa in the compressive layer, which has a depth of layer of at least 30 µm. In some embodiments, the ion exchange bath comprises potassium nitrate (KNO$_3$). The ion exchange bath may also comprise up to about 0.6 mol % and, in some embodiments, up to about 0.2 mol % sodium nitrate (NaNO$_3$). The ion exchange bath may further comprise compounds that act to reduce attack of the bath vessel or the glass article by the molten salt. Such additional components may include, but are not limited to, selected components of the glass, such as silicic acid, alumina in gel form, silica in gel form, or the like.

In some embodiments, method 200 further includes annealing the aluminosilicate glass at a temperature that is between the strain point of the glass and the glass transition temperature Tg of the glass (step 215) prior to ion exchanging the glass (step 220). In some embodiments, the aluminosilicate glass is annealed at this temperature for up to two hours and then cooled at a rate of up to (i.e., less than or equal to) 1° C./second.

In other embodiments, the aluminosilicate glass is rapidly cooled at a rate of at least (i.e., greater than or equal to) _° C./second (step 217) after down drawing the glass and prior to ion exchanging the glass.

Following either annealing (step 215) or rapid cooling (step 217) of the aluminosilicate glass, the glass may, in some embodiments, be ground and/or polished (step 219) prior to ion exchange. In some embodiments, the glass may be ground and/or polished to a thickness of about 1 mm or less.

TABLE 1

Exemplary compositions of aluminosilicate glasses, expressed in mol %.

| Example | SiO$_2$ | Al$_2$O$_3$ | B$_2$O$_3$ | Na$_2$O | K$_2$O | MgO | CaO | ZnO | SnO$_2$ | CS (MPa) | DOL (µm) | CS criterion | Compensation criterion |
|---|---|---|---|---|---|---|---|---|---|---|---|---|---|
| 1 | 63.56 | 14.98 | 5.44 | 13.31 | 0.01 | 2.57 | 0.04 | 0 | 0.09 | 1009 | 30.7 | 137 | −4.2 |
| 2 | 60.13 | 16.38 | 4.99 | 14.85 | 0.49 | 2.95 | 0.09 | 0 | 0.1 | 1029 | 38.3 | 185 | −4 |
| 3 | 64.72 | 14.17 | 5.36 | 12.95 | 0.01 | 2.66 | 0.04 | 0 | 0.09 | 989 | 31.7 | 113 | −3.9 |
| 4 | 69.21 | 9.02 | 0 | 12.98 | 0.02 | 7.52 | 1.05 | 0 | 0.2 | 1042 | 31.3 | 162 | −3.5 |

TABLE 1-continued

Exemplary compositions of aluminosilicate glasses, expressed in mol %.

| Example | SiO$_2$ | Al$_2$O$_3$ | B$_2$O$_3$ | Na$_2$O | K$_2$O | MgO | CaO | ZnO | SnO$_2$ | CS (MPa) | DOL (μm) | CS criterion | Compensation criterion |
|---|---|---|---|---|---|---|---|---|---|---|---|---|---|
| 5 | 70.43 | 9.07 | 0 | 13.09 | 0.02 | 7.13 | 0.06 | 0 | 0.19 | 1040 | 34.5 | 166 | −3.1 |
| 6 | 65.45 | 13.23 | 5.15 | 12.99 | 0.07 | 2.93 | 0.05 | 0 | 0.11 | 958 | 32.4 | 93 | −3.1 |
| 7 | 70.57 | 9.07 | 0 | 12.06 | 0.96 | 7.07 | 0.06 | 0 | 0.19 | 975 | 39.8 | 92 | −3.1 |
| 8 | 65.44 | 13.22 | 5.16 | 13.02 | 0.07 | 2.92 | 0.05 | 0 | 0.11 | 956 | 32.4 | 92 | −3.1 |
| 9 | 65.03 | 13.81 | 5.32 | 12.98 | 0.09 | 2.37 | 0.29 | 0 | 0.09 | 994 | 29.6 | 96 | −3.1 |
| 10 | 65.46 | 13.24 | 5.07 | 13.02 | 0.07 | 2.95 | 0.05 | 0 | 0.12 | 967 | 32.1 | 96 | −3.1 |
| 11 | 69.29 | 9.39 | 0 | 13.12 | 0.6 | 7.33 | 0.07 | 0 | 0.18 | 1076 | 35.6 | 141 | −3 |
| 12 | 69.5 | 9.35 | 0 | 13.14 | 0.47 | 7.28 | 0.07 | 0 | 0.18 | 1075 | 35.1 | 148 | −3 |
| 13 | 60.86 | 16.54 | 5.03 | 14.94 | 0.5 | 1.93 | 0.08 | 0 | 0.1 | 1095 | 31.8 | 182 | −3 |
| 14 | 60.86 | 16.54 | 5.03 | 14.94 | 0.5 | 1.93 | 0.08 | 0 | 0.1 | 1056 | 41.3 | 182 | −3 |
| 15 | 65.29 | 13.29 | 5.17 | 13.1 | 0.07 | 2.9 | 0.05 | 0 | 0.11 | 910 | 36.3 | 95 | −3 |
| 16 | 65.47 | 13.24 | 5.12 | 13.03 | 0.07 | 2.89 | 0.05 | 0 | 0.11 | 965 | 32.3 | 94 | −3 |
| 17 | 69.7 | 9.4 | 0 | 13.05 | 0.47 | 7.12 | 0.07 | 0 | 0.18 | 1060 | 33.8 | 147 | −3 |
| 18 | 69.51 | 9.28 | 0 | 13.2 | 0.47 | 7.28 | 0.07 | 0 | 0.18 | 1079 | 34.2 | 147 | −2.9 |
| 19 | 68.84 | 9.83 | 0 | 13.07 | 0.93 | 7.06 | 0.07 | 0 | 0.18 | 1084 | 38.8 | 130 | −2.9 |
| 20 | 65.07 | 13.55 | 5.19 | 13.25 | 0.07 | 2.71 | 0.04 | 0 | 0.11 | 987 | 33.4 | 102 | −2.9 |
| 21 | 69.32 | 9.25 | 0 | 13.15 | 0.65 | 7.36 | 0.07 | 0 | 0.18 | 1056 | 36.3 | 135 | −2.8 |
| 22 | 65.46 | 13.21 | 5.1 | 13.15 | 0.07 | 2.85 | 0.05 | 0 | 0.11 | 949 | 33.7 | 95 | −2.8 |
| 23 | 64.96 | 13.67 | 5.15 | 13.37 | 0.07 | 2.59 | 0.04 | 0 | 0.13 | 1017 | 33.2 | 108 | −2.8 |
| 24 | 69.86 | 10.05 | 0 | 12.61 | 0.97 | 6.23 | 0.05 | 0 | 0.19 | 1025 | 44.1 | 120 | −2.7 |
| 25 | 68.62 | 9.85 | 0 | 13.74 | 0.49 | 7.04 | 0.07 | 0 | 0.18 | 1003 | 34.3 | 168 | −2.7 |
| 26 | 64.83 | 13.91 | 5.07 | 13.57 | 0.07 | 2.38 | 0.04 | 0 | 0.1 | 1028 | 33.7 | 118 | −2.7 |
| 27 | 69.88 | 9.28 | 0 | 13.01 | 0.6 | 6.97 | 0.06 | 0 | 0.18 | 964 | 33.8 | 134 | −2.6 |
| 28 | 65.52 | 13.15 | 5.14 | 13.22 | 0.07 | 2.73 | 0.04 | 0 | 0.11 | 968 | 32.3 | 93 | −2.6 |
| 29 | 70.17 | 9.09 | 0 | 12.02 | 0.98 | 6.53 | 1 | 0 | 0.2 | 983 | 36 | 82 | −2.6 |
| 30 | 64.88 | 13.96 | 5.08 | 13.59 | 0.07 | 2.25 | 0.04 | 0 | 0.1 | 1016 | 35.1 | 118 | −2.6 |
| 31 | 64.7 | 13.96 | 5.16 | 13.65 | 0.07 | 2.3 | 0.04 | 0 | 0.1 | 1021 | 34.1 | 117 | −2.5 |
| 32 | 68.93 | 10.23 | 0 | 14.13 | 0.01 | 6.43 | 0.07 | 0 | 0.2 | 1104 | 38.4 | 209 | −2.5 |
| 33 | 71.24 | 9.25 | 0 | 12.07 | 0.98 | 6.2 | 0.05 | 0 | 0.19 | 979 | 41.6 | 89 | −2.4 |
| 34 | 66.82 | 9.48 | 0 | 14.47 | 0.78 | 8.18 | 0.08 | 0 | 0.18 | 1021 | 32.7 | 161 | −2.4 |
| 35 | 68.15 | 9.75 | 0 | 14 | 0.59 | 7.25 | 0.07 | 0 | 0.18 | 1020 | 32.8 | 165 | −2.4 |
| 36 | 69.63 | 9.08 | 0 | 12.97 | 0.95 | 7.09 | 0.07 | 0 | 0.2 | 994 | 43.5 | 107 | −2.3 |
| 37 | 71.3 | 9.15 | 0 | 13.05 | 0.01 | 6.23 | 0.05 | 0 | 0.19 | 1004 | 36.4 | 161 | −2.3 |
| 38 | 68.17 | 9.16 | 0 | 13.98 | 0.69 | 7.74 | 0.07 | 0 | 0.18 | 996 | 32.8 | 146 | −2.2 |
| 39 | 69.52 | 9.03 | 0 | 13.04 | 0.95 | 7.18 | 0.06 | 0 | 0.19 | 1025 | 39.1 | 108 | −2.2 |
| 40 | 70 | 9.35 | 0 | 13.27 | 0.49 | 6.63 | 0.06 | 0 | 0.18 | 968 | 34.7 | 144 | −2.2 |
| 41 | 71.52 | 9.06 | 0 | 12.06 | 0.97 | 6.13 | 0.05 | 0 | 0.2 | 954 | 44 | 84 | −2.2 |
| 42 | 66.12 | 13.98 | 4.67 | 13.21 | 0.28 | 1.56 | 0.06 | 0 | 0.1 | 987 | 40.3 | 106 | −2.1 |
| 43 | 71.56 | 9.06 | 0 | 13.03 | 0.02 | 6.07 | 0.06 | 0 | 0.19 | 1019 | 37.6 | 156 | −2.1 |
| 44 | 69.59 | 10.04 | 0 | 13.05 | 0.96 | 6.1 | 0.05 | 0 | 0.19 | 1033 | 43.9 | 126 | −2.1 |
| 45 | 65.98 | 14.02 | 4.73 | 13.25 | 0.28 | 1.55 | 0.07 | 0 | 0.1 | 1000 | 40.4 | 106 | −2 |
| 46 | 65.55 | 13.09 | 5.1 | 13.51 | 0.07 | 2.51 | 0.04 | 0 | 0.11 | 964 | 33.1 | 95 | −2 |
| 47 | 69.13 | 9.86 | 0 | 13.55 | 0.76 | 6.44 | 0.07 | 0 | 0.18 | 1084 | 40.6 | 144 | −2 |
| 48 | 61.35 | 16.7 | 5.1 | 15.15 | 0.51 | 1 | 0.08 | 0 | 0.1 | 1091 | 35.5 | 179 | −2 |
| 49 | 65.65 | 13.95 | 5.1 | 13.27 | 0.28 | 1.57 | 0.07 | 0 | 0.1 | 988 | 38.5 | 94 | −2 |
| 50 | 66.07 | 13.98 | 4.65 | 13.28 | 0.28 | 1.55 | 0.06 | 0 | 0.11 | 1007 | 40.3 | 108 | −2 |
| 51 | 66.18 | 13.92 | 4.66 | 13.23 | 0.28 | 1.56 | 0.06 | 0 | 0.1 | 995 | 40.4 | 105 | −2 |
| 52 | 65.22 | 13.98 | 5.5 | 13.27 | 0.28 | 1.56 | 0.07 | 0 | 0.1 | 983 | 36.8 | 83 | −2 |
| 53 | 61.35 | 16.7 | 5.1 | 15.15 | 0.51 | 1 | 0.08 | 0 | 0.1 | 1028 | 48.5 | 179 | −2 |
| 54 | 66.16 | 13.96 | 4.6 | 13.27 | 0.28 | 1.56 | 0.06 | 0 | 0.1 | 995 | 40.6 | 108 | −2 |
| 55 | 69.77 | 9.47 | 0 | 12.69 | 1.11 | 6.26 | 0.49 | 0 | 0.18 | 998 | 39.8 | 95 | −1.9 |
| 56 | 69.79 | 8.48 | 0 | 12.67 | 1.12 | 7.24 | 0.49 | 0 | 0.18 | 995 | 37 | 75 | −1.9 |
| 57 | 69.73 | 8.5 | 0 | 13.69 | 0.17 | 7.22 | 0.48 | 0 | 0.18 | 1037 | 30.9 | 150 | −1.9 |
| 58 | 64.62 | 13.97 | 6.05 | 13.33 | 0.28 | 1.55 | 0.07 | 0 | 0.1 | 961 | 36.7 | 68 | −1.9 |
| 59 | 65.86 | 13.7 | 4.82 | 13.42 | 0.21 | 1.82 | 0.06 | 0 | 0.1 | 985 | 38.3 | 104 | −1.9 |
| 60 | 69.75 | 9.48 | 0 | 13.68 | 0.15 | 6.25 | 0.48 | 0 | 0.18 | 1088 | 34.6 | 170 | −1.9 |
| 61 | 64.68 | 13.96 | 6.08 | 13.3 | 0.28 | 1.52 | 0.07 | 0 | 0.1 | 963 | 36.2 | 66 | −1.9 |
| 62 | 65.59 | 13.32 | 5.05 | 13.61 | 0.09 | 2.16 | 0.04 | 0 | 0.11 | 965 | 35.9 | 100 | −1.8 |
| 63 | 64.55 | 14.01 | 6.1 | 13.4 | 0.28 | 1.47 | 0.06 | 0 | 0.1 | 950 | 36.4 | 68 | −1.8 |
| 64 | 65.85 | 13.57 | 4.87 | 13.46 | 0.18 | 1.9 | 0.05 | 0 | 0.11 | 980 | 37.4 | 102 | −1.8 |
| 65 | 65.6 | 13.23 | 5.06 | 13.66 | 0.07 | 2.2 | 0.04 | 0 | 0.12 | 986 | 34.1 | 100 | −1.7 |
| 66 | 65.67 | 13.25 | 5.02 | 13.62 | 0.08 | 2.18 | 0.04 | 0 | 0.12 | 967 | 35.5 | 100 | −1.7 |
| 67 | 69.64 | 9.14 | 0 | 12.8 | 0.97 | 6.28 | 0.96 | 0 | 0.2 | 1026 | 36.2 | 94 | −1.7 |
| 68 | 65.59 | 13.24 | 5.08 | 13.63 | 0.07 | 2.2 | 0.04 | 0 | 0.12 | 972 | 34.3 | 99 | −1.7 |
| 69 | 64.72 | 13.97 | 6.02 | 13.44 | 0.28 | 1.39 | 0.06 | 0 | 0.1 | 954 | 34.9 | 69 | −1.6 |
| 70 | 68.12 | 10.29 | 0 | 15.06 | 0.02 | 6.24 | 0.05 | 0 | 0.19 | 1114 | 39 | 223 | −1.5 |
| 71 | 68.72 | 10.18 | 0 | 14.77 | 0.02 | 6.06 | 0.05 | 0 | 0.18 | 1138 | 37.9 | 214 | −1.5 |
| 72 | 65.44 | 13.23 | 5.13 | 13.79 | 0.07 | 2.15 | 0.04 | 0 | 0.12 | 984 | 34.1 | 99 | −1.5 |
| 73 | 68.81 | 8.85 | 0 | 13.64 | 1.09 | 7.33 | 0.06 | 0 | 0.17 | 975 | 42.9 | 105 | −1.5 |
| 74 | 69.76 | 9.57 | 0 | 12.35 | 1.91 | 6.15 | 0.06 | 0 | 0.19 | 965 | 50.2 | 44 | −1.5 |
| 75 | 68.61 | 10.17 | 0 | 14.86 | 0.02 | 6.08 | 0.05 | 0 | 0.18 | 1136 | 38.2 | 215 | −1.4 |
| 76 | 68.45 | 8.46 | 0 | 13.68 | 1.12 | 7.6 | 0.49 | 0 | 0.18 | 996 | 36.8 | 93 | −1.3 |
| 77 | 68.4 | 10.14 | 0 | 14.98 | 0.01 | 6.19 | 0.07 | 0 | 0.19 | 1109 | 38.3 | 218 | −1.3 |
| 78 | 68.33 | 10.13 | 0 | 15.05 | 0.02 | 6.21 | 0.05 | 0 | 0.18 | 1144 | 37.7 | 218 | −1.3 |
| 79 | 70.58 | 10.06 | 0 | 13.04 | 0.96 | 5.1 | 0.05 | 0 | 0.19 | 1001 | 48.6 | 118 | −1.2 |

TABLE 1-continued

Exemplary compositions of aluminosilicate glasses, expressed in mol %.

| Example | $SiO_2$ | $Al_2O_3$ | $B_2O_3$ | $Na_2O$ | $K_2O$ | MgO | CaO | ZnO | $SnO_2$ | CS (MPa) | DOL (μm) | CS criterion | Compensation criterion |
|---|---|---|---|---|---|---|---|---|---|---|---|---|---|
| 80 | 69.12 | 10.14 | 0 | 14.56 | 0.13 | 5.78 | 0.06 | 0 | 0.18 | 1122 | 38.5 | 201 | −1.2 |
| 81 | 68.82 | 10.19 | 0 | 14.85 | 0.01 | 5.85 | 0.06 | 0 | 0.2 | 1147 | 36.9 | 214 | −1.2 |
| 82 | 70.64 | 9.02 | 0 | 12.05 | 1.88 | 6.15 | 0.05 | 0 | 0.19 | 930 | 48.3 | 27 | −1.2 |
| 83 | 68.26 | 10.38 | 0 | 15.14 | 0.02 | 5.94 | 0.05 | 0 | 0.19 | 1160 | 37.3 | 224 | −1.2 |
| 84 | 64.65 | 13.99 | 6.05 | 13.72 | 0.28 | 1.14 | 0.06 | 0 | 0.1 | 960 | 36.4 | 71 | −1.1 |
| 85 | 65.6 | 12.99 | 5.12 | 13.94 | 0.07 | 2.11 | 0.04 | 0 | 0.11 | 966 | 33.8 | 95 | −1.1 |
| 86 | 62.04 | 16.89 | 5.12 | 15.24 | 0.51 | 0.02 | 0.07 | 0 | 0.1 | 1030 | 53.6 | 177 | −1.1 |
| 87 | 51.33 | 20.21 | 7.03 | 19.17 | 0.97 | 1.03 | 0.13 | 0 | 0.1 | 1087 | 44.8 | 253 | −1.1 |
| 88 | 68.55 | 10.4 | 0 | 15.04 | 0.01 | 5.73 | 0.06 | 0 | 0.2 | 1104 | 39.5 | 222 | −1.1 |
| 89 | 62.04 | 16.89 | 5.12 | 15.24 | 0.51 | 0.02 | 0.07 | 0 | 0.1 | 1085 | 39.6 | 177 | −1.1 |
| 90 | 70.58 | 9.01 | 0 | 13.06 | 0.96 | 6.14 | 0.05 | 0 | 0.19 | 999 | 43.5 | 98 | −1.1 |
| 91 | 51.33 | 20.21 | 7.03 | 19.17 | 0.97 | 1.03 | 0.13 | 0 | 0.1 | 1046 | 32.4 | 253 | −1.1 |
| 92 | 69.18 | 10.27 | 0 | 14.7 | 0.01 | 5.57 | 0.06 | 0 | 0.2 | 1089 | 40.7 | 212 | −1.1 |
| 93 | 70.65 | 8.06 | 0 | 13.02 | 0.97 | 7.03 | 0.06 | 0 | 0.19 | 941 | 40.6 | 79 | −1.1 |
| 94 | 68.28 | 10.61 | 0 | 14.34 | 0.81 | 5.68 | 0.08 | 0 | 0.19 | 1115 | 42.7 | 167 | −1.1 |
| 95 | 70.74 | 8.49 | 0 | 13.63 | 0.17 | 6.28 | 0.49 | 0 | 0.18 | 1004 | 33.4 | 141 | −1 |
| 96 | 68.44 | 10.44 | 0 | 15.12 | 0.05 | 5.69 | 0.05 | 0 | 0.19 | 1139 | 38.9 | 222 | −1 |
| 97 | 65.41 | 13.11 | 5.16 | 14.06 | 0.07 | 2.01 | 0.04 | 0 | 0.11 | 975 | 34 | 98 | −1 |
| 98 | 70.09 | 9.08 | 0 | 14.31 | 0.01 | 6.23 | 0.07 | 0 | 0.2 | 1029 | 35.3 | 179 | −1 |
| 99 | 68.03 | 10.08 | 0 | 15.33 | 0.04 | 6.26 | 0.06 | 0 | 0.18 | 1138 | 37.6 | 220 | −1 |
| 100 | 68.36 | 10.14 | 0 | 15.19 | 0.02 | 6.04 | 0.05 | 0 | 0.18 | 1137 | 38.1 | 219 | −1 |
| 101 | 63.72 | 14.96 | 7.05 | 13.57 | 0.5 | 0.02 | 0.06 | 0 | 0.1 | 953 | 36.6 | 44 | −0.9 |
| 102 | 69.72 | 9.49 | 0 | 13.12 | 1.45 | 5.95 | 0.08 | 0 | 0.18 | 916 | 43 | 81 | −0.9 |
| 103 | 70.79 | 9.06 | 0 | 13.99 | 0.02 | 5.89 | 0.05 | 0 | 0.19 | 1034 | 37.5 | 170 | −0.9 |
| 104 | 70.8 | 8.48 | 0 | 12.68 | 1.12 | 6.23 | 0.48 | 0 | 0.18 | 945 | 39.5 | 67 | −0.9 |
| 105 | 69.09 | 10.24 | 0 | 14.83 | 0.05 | 5.55 | 0.05 | 0 | 0.18 | 1123 | 38.9 | 211 | −0.9 |
| 106 | 68.23 | 10.56 | 0 | 15.31 | 0.01 | 5.64 | 0.05 | 0 | 0.19 | 1115 | 40.6 | 230 | −0.9 |
| 107 | 68.91 | 10.22 | 0 | 14.7 | 0.26 | 5.66 | 0.06 | 0 | 0.18 | 1117 | 39.8 | 196 | −0.9 |
| 108 | 68.08 | 9.66 | 0 | 15 | 0.34 | 6.54 | 0.17 | 0 | 0.18 | 1105 | 37.4 | 187 | −0.9 |
| 109 | 68.46 | 10.53 | 0 | 14.71 | 0.49 | 5.54 | 0.07 | 0 | 0.19 | 1115 | 41.7 | 189 | −0.9 |
| 110 | 68.8 | 9.48 | 0 | 13.67 | 1.11 | 6.23 | 0.48 | 0 | 0.18 | 1025 | 40.1 | 110 | −0.9 |
| 111 | 69.09 | 9.79 | 0 | 14.86 | 0.01 | 5.98 | 0.05 | 0 | 0.2 | 1058 | 39.7 | 205 | −0.9 |
| 112 | 68.06 | 9.95 | 0 | 15.28 | 0.13 | 6.28 | 0.09 | 0 | 0.18 | 1124 | 37.3 | 211 | −0.8 |
| 113 | 64.47 | 14.01 | 7.01 | 13.78 | 0 | 0.53 | 0.07 | 0 | 0.1 | 973 | 31.2 | 57 | −0.8 |
| 114 | 67.29 | 11.27 | 0 | 15.82 | 0.01 | 5.35 | 0.05 | 0 | 0.2 | 1127 | 42.9 | 255 | −0.8 |
| 115 | 64.48 | 14.03 | 5.97 | 13.81 | 0.5 | 1.03 | 0.07 | 0 | 0.1 | 1007 | 32 | 62 | −0.8 |
| 116 | 68.54 | 10.14 | 0 | 15.18 | 0.01 | 5.89 | 0.05 | 0 | 0.18 | 1122 | 38.8 | 218 | −0.8 |
| 117 | 66.37 | 12.04 | 0 | 16.29 | 0.01 | 5.03 | 0.05 | 0 | 0.21 | 1175 | 43.5 | 280 | −0.8 |
| 118 | 64.48 | 14.03 | 5.97 | 13.81 | 0.5 | 1.03 | 0.07 | 0 | 0.1 | 948 | 40.2 | 62 | −0.8 |
| 119 | 68.74 | 10.22 | 0 | 15.12 | 0.01 | 5.66 | 0.05 | 0 | 0.18 | 1111 | 38.6 | 218 | −0.8 |
| 120 | 61.95 | 16.69 | 5.09 | 15.53 | 0.51 | 0.02 | 0.08 | 0 | 0.1 | 1143 | 34.8 | 177 | −0.7 |
| 121 | 68.62 | 10.2 | 0 | 14.97 | 0.24 | 5.71 | 0.05 | 0 | 0.19 | 1081 | 40 | 201 | −0.7 |
| 122 | 71.42 | 8.97 | 0 | 12.46 | 1.36 | 5.54 | 0.06 | 0 | 0.18 | 870 | 42.6 | 59 | −0.7 |
| 123 | 61.95 | 16.69 | 5.09 | 15.53 | 0.51 | 0.02 | 0.08 | 0 | 0.1 | 1144 | 38.3 | 177 | −0.7 |
| 124 | 63.17 | 13.16 | 5.96 | 14.5 | 0.49 | 2.5 | 0.08 | 0 | 0.1 | 1000 | 30.4 | 61 | −0.7 |
| 125 | 64.42 | 13.5 | 0 | 17.28 | 0.01 | 4.54 | 0.05 | 0 | 0.2 | 1260 | 45.6 | 331 | −0.7 |
| 126 | 68.34 | 10.43 | 0 | 15.13 | 0.2 | 5.62 | 0.05 | 0 | 0.19 | 1108 | 39.7 | 212 | −0.7 |
| 127 | 63.39 | 14.04 | 7.02 | 13.84 | 0.5 | 1.03 | 0.07 | 0 | 0.1 | 994 | 30.2 | 32 | −0.7 |
| 128 | 62.63 | 14.99 | 0 | 18.22 | 0.01 | 3.91 | 0.04 | 0 | 0.2 | 1392 | 35.3 | 381 | −0.7 |
| 129 | 68.94 | 10.1 | 0 | 15.07 | 0.01 | 5.62 | 0.05 | 0 | 0.18 | 1106 | 38.8 | 213 | −0.6 |
| 130 | 64.41 | 14.95 | 6.04 | 13.89 | 0.52 | 0.02 | 0.06 | 0 | 0.1 | 970 | 41 | 77 | −0.6 |
| 131 | 64.41 | 14.95 | 6.04 | 13.89 | 0.52 | 0.02 | 0.06 | 0 | 0.1 | 961 | 35.6 | 77 | −0.6 |
| 132 | 61.91 | 16.67 | 5.1 | 15.57 | 0.51 | 0.02 | 0.08 | 0 | 0.1 | 1129 | 39.2 | 177 | −0.6 |
| 133 | 70.67 | 8.16 | 0 | 12.78 | 0.97 | 6.22 | 0.99 | 0 | 0.2 | 959 | 35.8 | 67 | −0.6 |
| 134 | 61.91 | 16.67 | 5.1 | 15.57 | 0.51 | 0.02 | 0.08 | 0 | 0.1 | 1129 | 36.3 | 177 | −0.6 |
| 135 | 70.67 | 9.17 | 0 | 12.83 | 0.95 | 5.19 | 0.98 | 0 | 0.2 | 989 | 39.2 | 88 | −0.6 |
| 136 | 68.21 | 10.54 | 0 | 15.31 | 0.16 | 5.51 | 0.05 | 0 | 0.19 | 1142 | 40 | 219 | −0.6 |
| 137 | 65.6 | 12.98 | 5.11 | 14.24 | 0.07 | 1.84 | 0.04 | 0 | 0.11 | 961 | 34.1 | 98 | −0.5 |
| 138 | 64.48 | 14.34 | 7.05 | 13.4 | 0.51 | 0.02 | 0.08 | 0 | 0.1 | 943 | 33.1 | 24 | −0.5 |
| 139 | 69.83 | 8.49 | 0 | 13.19 | 1.12 | 6.19 | 0.98 | 0 | 0.18 | 956 | 41 | 73 | −0.4 |
| 140 | 69.78 | 8.49 | 0 | 13.67 | 1.12 | 6.66 | 0.07 | 0 | 0.18 | 974 | 40.8 | 88 | −0.4 |
| 141 | 68.41 | 10.45 | 0 | 15.15 | 0.31 | 5.42 | 0.05 | 0 | 0.19 | 1100 | 40.8 | 204 | −0.4 |
| 142 | 65.53 | 12.9 | 5.19 | 14.31 | 0.07 | 1.83 | 0.04 | 0 | 0.12 | 970 | 33.5 | 94 | −0.4 |
| 143 | 69.2 | 10.19 | 0 | 15.08 | 0.01 | 5.27 | 0.05 | 0 | 0.18 | 1109 | 40.5 | 213 | −0.4 |
| 144 | 68.21 | 10.65 | 0 | 15.61 | 0.01 | 5.26 | 0.06 | 0 | 0.2 | 1093 | 41.6 | 234 | −0.3 |
| 145 | 52.73 | 20.37 | 6.53 | 19.14 | 0.97 | 0.01 | 0.12 | 0 | 0.1 | 1185 | 33.9 | 263 | −0.3 |
| 146 | 69.57 | 9.02 | 0 | 13.99 | 0.96 | 6.2 | 0.06 | 0 | 0.19 | 989 | 43.9 | 114 | −0.3 |
| 147 | 69.38 | 10.16 | 0 | 15.03 | 0.01 | 5.15 | 0.06 | 0 | 0.2 | 1060 | 41.7 | 211 | −0.3 |
| 148 | 64.46 | 14.2 | 7.16 | 13.45 | 0.51 | 0.02 | 0.08 | 0 | 0.09 | 944 | 32.8 | 17 | −0.3 |
| 149 | 69.62 | 10.1 | 0 | 14.93 | 0.01 | 5.1 | 0.05 | 0 | 0.18 | 1079 | 40.3 | 207 | −0.3 |
| 150 | 52.73 | 20.37 | 6.53 | 19.14 | 0.97 | 0.01 | 0.12 | 0 | 0.1 | 1143 | 45.5 | 263 | −0.3 |
| 151 | 68.55 | 10.39 | 0 | 15.07 | 0.42 | 5.3 | 0.05 | 0 | 0.19 | 1100 | 42.3 | 194 | −0.2 |
| 152 | 69.6 | 9.06 | 0 | 13.07 | 1.92 | 6.09 | 0.05 | 0 | 0.19 | 934 | 48.7 | 41 | −0.2 |
| 153 | 64.5 | 14.19 | 7.03 | 13.54 | 0.51 | 0.02 | 0.08 | 0 | 0.09 | 947 | 32.5 | 23 | −0.2 |
| 154 | 63.65 | 13.16 | 5.97 | 14.51 | 0.49 | 2 | 0.08 | 0 | 0.1 | 995 | 31.7 | 57 | −0.2 |

TABLE 1-continued

Exemplary compositions of aluminosilicate glasses, expressed in mol %.

| Example | SiO$_2$ | Al$_2$O$_3$ | B$_2$O$_3$ | Na$_2$O | K$_2$O | MgO | CaO | ZnO | SnO$_2$ | CS (MPa) | DOL (μm) | CS criterion | Compensation criterion |
|---|---|---|---|---|---|---|---|---|---|---|---|---|---|
| 155 | 56.22 | 20.76 | 2.07 | 19.66 | 0.98 | 0.05 | 0.13 | 0 | 0.11 | 1403 | 34.1 | 410 | −0.2 |
| 156 | 69.71 | 8.03 | 0 | 13.01 | 1.92 | 7.07 | 0.06 | 0 | 0.2 | 921 | 44.9 | 20 | −0.2 |
| 157 | 69.32 | 10.08 | 0 | 15.12 | 0.01 | 5.23 | 0.05 | 0 | 0.18 | 1078 | 41.3 | 211 | −0.2 |
| 158 | 64.5 | 14.19 | 7.03 | 13.54 | 0.51 | 0.02 | 0.08 | 0 | 0.09 | 954 | 33.9 | 23 | −0.2 |
| 159 | 56.36 | 19.7 | 4.01 | 18.63 | 0.99 | 0.05 | 0.13 | 0 | 0.1 | 1250 | 39.9 | 309 | −0.1 |
| 160 | 69.26 | 8.54 | 0 | 13.82 | 1.12 | 6.55 | 0.52 | 0 | 0.18 | 998 | 37.1 | 89 | −0.1 |
| 161 | 69.31 | 10.29 | 0 | 15.14 | 0.01 | 5.01 | 0.05 | 0 | 0.18 | 1094 | 40.9 | 215 | −0.1 |
| 162 | 62.01 | 16.42 | 4.99 | 15.83 | 0.51 | 0.03 | 0.08 | 0 | 0.1 | 1107 | 41.3 | 177 | −0.1 |
| 163 | 64.52 | 14.18 | 7 | 13.55 | 0.51 | 0.02 | 0.08 | 0 | 0.1 | 944 | 33.2 | 23 | −0.1 |
| 164 | 64.58 | 13.99 | 6.11 | 14.23 | 0.28 | 0.63 | 0.06 | 0 | 0.1 | 965 | 36.7 | 73 | −0.1 |
| 165 | 62.04 | 16.41 | 4.94 | 15.87 | 0.51 | 0.02 | 0.08 | 0 | 0.1 | 1166 | 36.5 | 179 | −0.1 |
| 166 | 56.36 | 19.7 | 4.01 | 18.63 | 0.99 | 0.05 | 0.13 | 0 | 0.1 | 1266 | 42 | 309 | −0.1 |
| 167 | 65.6 | 12.89 | 5.15 | 14.42 | 0.07 | 1.69 | 0.04 | 0 | 0.11 | 971 | 33.1 | 96 | −0.1 |
| 168 | 68.78 | 10.19 | 0 | 14.92 | 0.49 | 5.35 | 0.05 | 0 | 0.19 | 1088 | 42.1 | 182 | −0.1 |
| 169 | 71.68 | 9.04 | 0 | 13.02 | 0.95 | 5.06 | 0.05 | 0 | 0.19 | 956 | 46.5 | 91 | −0.1 |
| 170 | 62.04 | 16.41 | 4.94 | 15.87 | 0.51 | 0.02 | 0.08 | 0 | 0.1 | 1192 | 34.6 | 179 | −0.1 |
| 171 | 71.61 | 8.07 | 0 | 13.04 | 0.97 | 6.05 | 0.05 | 0 | 0.19 | 909 | 42.4 | 71 | −0.1 |
| 172 | 62.01 | 16.42 | 4.99 | 15.83 | 0.51 | 0.03 | 0.08 | 0 | 0.1 | 1114 | 32.2 | 177 | −0.1 |
| 173 | 64.37 | 13.96 | 7.02 | 13.97 | 0.01 | 0.01 | 0.06 | 0.48 | 0.1 | 985 | 30.6 | 54 | 0 |
| 174 | 69.72 | 8.5 | 0 | 13.67 | 1.13 | 6.28 | 0.48 | 0 | 0.18 | 956 | 39.9 | 83 | 0 |
| 175 | 50.5 | 21.09 | 7.04 | 20.12 | 0.98 | 0.02 | 0.13 | 0 | 0.1 | 1228 | 34.8 | 283 | 0 |
| 176 | 69.83 | 8.47 | 0 | 12.69 | 2.07 | 6.25 | 0.48 | 0 | 0.18 | 932 | 31.8 | 9 | 0 |
| 177 | 69.26 | 8.78 | 0 | 15.01 | 0.22 | 6.43 | 0.06 | 0 | 0.2 | 973 | 35.9 | 171 | 0 |
| 178 | 65.81 | 12.84 | 5.04 | 14.39 | 0.07 | 1.67 | 0.04 | 0 | 0.12 | 988 | 33 | 97 | 0 |
| 179 | 50.5 | 21.09 | 7.04 | 20.12 | 0.98 | 0.02 | 0.13 | 0 | 0.1 | 1178 | 45 | 283 | 0 |
| 180 | 54.37 | 19.19 | 6.98 | 18.19 | 0.99 | 0.02 | 0.12 | 0 | 0.1 | 1101 | 46.7 | 202 | 0 |
| 181 | 69.69 | 8.5 | 0 | 14.65 | 0.17 | 6.3 | 0.48 | 0 | 0.18 | 1019 | 34.9 | 157 | 0 |
| 182 | 69.27 | 8.55 | 0 | 14.97 | 0.01 | 6.47 | 0.52 | 0 | 0.19 | 1049 | 31.6 | 175 | 0 |
| 183 | 54.37 | 19.19 | 6.98 | 18.19 | 0.99 | 0.02 | 0.12 | 0 | 0.1 | 1157 | 33.4 | 202 | 0 |
| 184 | 69.94 | 10.26 | 0 | 15.06 | 0.01 | 4.48 | 0.04 | 0 | 0.17 | 1041 | 42 | 208 | 0.3 |
| 185 | 69.92 | 10.09 | 0 | 15.12 | 0.01 | 4.62 | 0.04 | 0 | 0.18 | 1029 | 42 | 206 | 0.4 |
| 186 | 68.48 | 11.89 | 3.88 | 14.93 | 0.5 | 0.07 | 0.08 | 0 | 0.12 | 957 | 32.9 | 73 | 3.5 |
| 187 | 64.08 | 15.63 | 3.97 | 15.6 | 0.52 | 0.01 | 0.07 | 0 | 0.1 | 1103 | 50.4 | 181 | 0.5 |
| 188 | 68.08 | 11.91 | 4.37 | 14.84 | 0.51 | 0.05 | 0.07 | 0 | 0.12 | 969 | 32.1 | 58 | 3.4 |
| 189 | 66.14 | 13.98 | 4.68 | 14.71 | 0.29 | 0.05 | 0.06 | 0 | 0.08 | 986 | 42.4 | 116 | 1 |
| 190 | 66.17 | 13.99 | 4.7 | 14.65 | 0.29 | 0.05 | 0.06 | 0 | 0.08 | 986 | 42.4 | 115 | 0.9 |
| 191 | 66.22 | 13.96 | 4.71 | 14.59 | 0.3 | 0.06 | 0.06 | 0 | 0.08 | 997 | 42.2 | 113 | 0.9 |
| 192 | 66.05 | 13.98 | 4.83 | 14.6 | 0.32 | 0.05 | 0.06 | 0 | 0.08 | 1002 | 40.4 | 108 | 0.9 |
| 193 | 65.9 | 13.97 | 4.86 | 14.77 | 0.29 | 0.05 | 0.06 | 0 | 0.09 | 992 | 39.8 | 112 | 1 |
| 194 | 62.14 | 16.21 | 4.92 | 16 | 0.51 | 0.02 | 0.08 | 0 | 0.1 | 1168 | 39.2 | 176 | 0.3 |
| 195 | 62.14 | 16.21 | 4.92 | 16 | 0.51 | 0.02 | 0.08 | 0 | 0.1 | 1167 | 36.1 | 176 | 0.3 |
| 196 | 65.9 | 13.99 | 4.98 | 14.61 | 0.31 | 0.05 | 0.06 | 0 | 0.09 | 981 | 42.5 | 105 | 0.9 |
| 197 | 57.08 | 18.53 | 4.99 | 18.69 | 0.49 | 0.01 | 0.07 | 0 | 0.1 | 1255 | 38.3 | 280 | 0.6 |
| 198 | 57.03 | 18.51 | 5.02 | 18.73 | 0.49 | 0.01 | 0.07 | 0 | 0.1 | 1261 | 35.7 | 279 | 0.7 |
| 199 | 62.07 | 16.17 | 5.03 | 15.98 | 0.5 | 0.02 | 0.08 | 0 | 0.09 | 1145 | 30.6 | 172 | 0.3 |
| 200 | 57.03 | 18.7 | 5.03 | 18.52 | 0.49 | 0.02 | 0.07 | 0 | 0.1 | 1247 | 31.7 | 281 | 0.3 |
| 201 | 62.07 | 16.17 | 5.03 | 15.98 | 0.5 | 0.02 | 0.08 | 0 | 0.09 | 1085 | 41.8 | 172 | 0.3 |
| 202 | 57.03 | 18.7 | 5.03 | 18.52 | 0.49 | 0.02 | 0.07 | 0 | 0.1 | 1235 | 40.9 | 281 | 0.3 |
| 203 | 62.19 | 15.8 | 5.04 | 16.26 | 0.5 | 0.02 | 0.07 | 0 | 0.1 | 969 | 49.6 | 166 | 0.9 |
| 204 | 62.19 | 15.8 | 5.04 | 16.26 | 0.5 | 0.02 | 0.07 | 0 | 0.1 | 1044 | 38.5 | 166 | 0.9 |
| 205 | 62.12 | 16.01 | 5.06 | 16.09 | 0.51 | 0.02 | 0.07 | 0 | 0.1 | 1105 | 38.5 | 168 | 0.6 |
| 206 | 62.12 | 16.01 | 5.06 | 16.09 | 0.51 | 0.02 | 0.07 | 0 | 0.1 | 1015 | 51.4 | 168 | 0.6 |
| 207 | 57.09 | 18.63 | 5.09 | 18.47 | 0.49 | 0.02 | 0.08 | 0 | 0.1 | 1273 | 37.9 | 276 | 0.3 |
| 208 | 57.09 | 18.63 | 5.09 | 18.47 | 0.49 | 0.02 | 0.08 | 0 | 0.1 | 1280 | 30.2 | 276 | 0.3 |
| 209 | 65.43 | 14.04 | 5.3 | 14.71 | 0.29 | 0.05 | 0.06 | 0 | 0.1 | 986 | 40.1 | 100 | 0.9 |
| 210 | 67.07 | 12.22 | 5.32 | 14.59 | 0.51 | 0.05 | 0.07 | 0 | 0.12 | 971 | 31.9 | 35 | 2.8 |
| 211 | 65.46 | 14.01 | 5.57 | 14.35 | 0.38 | 0.05 | 0.07 | 0 | 0.08 | 982 | 40.4 | 80 | 0.7 |
| 212 | 65.09 | 14.02 | 5.6 | 14.76 | 0.29 | 0.05 | 0.06 | 0 | 0.11 | 954 | 39.9 | 92 | 1 |
| 213 | 66.96 | 13.33 | 5.79 | 13.75 | 0.01 | 0.02 | 0.02 | 0 | 0.1 | 946 | 37.6 | 69 | 0.4 |
| 214 | 56.24 | 18.65 | 5.93 | 17.89 | 1 | 0.05 | 0.14 | 0 | 0.1 | 1232 | 35.2 | 213 | 0.2 |
| 215 | 56.24 | 18.65 | 5.93 | 17.89 | 1 | 0.05 | 0.14 | 0 | 0.1 | 1257 | 35 | 213 | 0.2 |
| 216 | 65.1 | 13.15 | 5.95 | 14.6 | 0.5 | 0.5 | 0.07 | 0 | 0.1 | 973 | 34.4 | 46 | 1.5 |
| 217 | 64.83 | 13.98 | 5.97 | 14.71 | 0.29 | 0.05 | 0.06 | 0 | 0.11 | 958 | 38.4 | 79 | 1 |
| 218 | 64.05 | 13.18 | 5.97 | 14.6 | 0.5 | 1.51 | 0.08 | 0 | 0.1 | 992 | 31.8 | 55 | 0.4 |
| 219 | 65.65 | 13.15 | 5.98 | 14.51 | 0.5 | 0.01 | 0.07 | 0 | 0.1 | 965 | 36 | 40 | 1.8 |
| 220 | 64.71 | 13.14 | 5.98 | 14.47 | 0.5 | 0.99 | 0.07 | 0 | 0.1 | 979 | 32.6 | 47 | 0.8 |
| 221 | 64.34 | 14 | 5.99 | 14.06 | 0.51 | 0.01 | 0.06 | 0.91 | 0.1 | 1039 | 31.4 | 55 | 0.6 |
| 222 | 64.34 | 14 | 5.99 | 14.06 | 0.51 | 0.01 | 0.06 | 0.91 | 0.1 | 964 | 41 | 55 | 0.6 |
| 223 | 64.72 | 14 | 6 | 14.76 | 0.28 | 0.05 | 0.06 | 0 | 0.11 | 955 | 38.4 | 80 | 1 |
| 224 | 64.46 | 13.96 | 6.01 | 14.86 | 0.51 | 0.01 | 0.06 | 0 | 0.1 | 986 | 31.5 | 66 | 1.4 |
| 225 | 65.13 | 14.02 | 6.03 | 14.15 | 0.44 | 0.06 | 0.08 | 0 | 0.08 | 947 | 40.8 | 61 | 0.5 |
| 226 | 64.69 | 13.99 | 6.04 | 14.77 | 0.28 | 0.05 | 0.06 | 0 | 0.11 | 979 | 36.7 | 79 | 1 |
| 227 | 64.59 | 13.99 | 6.06 | 14.51 | 0.28 | 0.39 | 0.06 | 0 | 0.11 | 978 | 37.8 | 77 | 0.4 |
| 228 | 65.35 | 14 | 6.11 | 13.84 | 0.51 | 0.01 | 0.06 | 0 | 0.1 | 945 | 36.8 | 49 | 0.3 |
| 229 | 66.17 | 12.32 | 6.23 | 14.49 | 0.5 | 0.05 | 0.07 | 0 | 0.12 | 957 | 31 | 11 | 2.6 |

TABLE 1-continued

Exemplary compositions of aluminosilicate glasses, expressed in mol %.

| Example | SiO$_2$ | Al$_2$O$_3$ | B$_2$O$_3$ | Na$_2$O | K$_2$O | MgO | CaO | ZnO | SnO$_2$ | CS (MPa) | DOL (μm) | CS criterion | Compensation criterion |
|---|---|---|---|---|---|---|---|---|---|---|---|---|---|
| 230 | 65.09 | 13.81 | 6.24 | 14.6 | 0.01 | 0.01 | 0.06 | 0 | 0.12 | 966 | 30.1 | 83 | 0.8 |
| 231 | 65.29 | 13.88 | 6.24 | 14.07 | 0.26 | 0.01 | 0.06 | 0 | 0.12 | 965 | 31.3 | 60 | 0.4 |
| 232 | 65.29 | 13.96 | 6.25 | 14 | 0.24 | 0.01 | 0.06 | 0 | 0.12 | 958 | 31.9 | 62 | 0.3 |
| 233 | 65.3 | 13.87 | 6.25 | 13.83 | 0.5 | 0.01 | 0.07 | 0 | 0.12 | 953 | 31.9 | 41 | 0.4 |
| 234 | 65.45 | 13.85 | 6.29 | 14.23 | 0.01 | 0.02 | 0.02 | 0 | 0.1 | 968 | 36 | 76 | 0.4 |
| 235 | 65.34 | 13.84 | 6.41 | 14.24 | 0.01 | 0.02 | 0.02 | 0 | 0.1 | 950 | 37.7 | 73 | 0.4 |
| 236 | 64.77 | 13.87 | 6.51 | 14.14 | 0.52 | 0.01 | 0.06 | 0 | 0.1 | 955 | 32.6 | 38 | 0.8 |
| 237 | 56.55 | 18.28 | 6.55 | 17.37 | 0.99 | 0.02 | 0.12 | 0 | 0.1 | 1160 | 33.6 | 177 | 0.1 |
| 238 | 56.55 | 18.28 | 6.55 | 17.37 | 0.99 | 0.02 | 0.12 | 0 | 0.1 | 1064 | 44.5 | 177 | 0.1 |
| 239 | 59.93 | 16.49 | 6.63 | 16.2 | 0.51 | 0.02 | 0.08 | 0 | 0.1 | 1126 | 34.6 | 138 | 0.2 |
| 240 | 59.93 | 16.49 | 6.63 | 16.2 | 0.51 | 0.02 | 0.08 | 0 | 0.1 | 1161 | 34.3 | 138 | 0.2 |
| 241 | 59.9 | 16.49 | 6.72 | 16.15 | 0.51 | 0.02 | 0.08 | 0 | 0.1 | 1126 | 33.8 | 135 | 0.1 |
| 242 | 64.56 | 14.03 | 7 | 13.67 | 0.51 | 0.02 | 0.08 | 0 | 0.09 | 945 | 32.4 | 21 | 0.1 |
| 243 | 64.56 | 14.03 | 7 | 13.67 | 0.51 | 0.02 | 0.08 | 0 | 0.09 | 969 | 34.4 | 21 | 0.1 |
| 244 | 59.89 | 16.3 | 7.01 | 16.06 | 0.51 | 0.02 | 0.08 | 0 | 0.1 | 1135 | 32.6 | 119 | 0.3 |
| 245 | 59.89 | 16.3 | 7.01 | 16.06 | 0.51 | 0.02 | 0.08 | 0 | 0.1 | 1139 | 35.4 | 119 | 0.3 |
| 246 | 64.41 | 13.99 | 7.02 | 13.8 | 0.51 | 0.05 | 0.09 | 0 | 0.1 | 900 | 39.6 | 22 | 0.3 |
| 247 | 64.56 | 13.9 | 7.03 | 14.31 | 0.01 | 0.01 | 0.06 | 0 | 0.1 | 946 | 32.4 | 57 | 0.4 |
| 248 | 64.52 | 13.86 | 7.05 | 13.81 | 0.51 | 0.02 | 0.08 | 0 | 0.09 | 978 | 32.7 | 17 | 0.4 |
| 249 | 64.52 | 13.86 | 7.05 | 13.81 | 0.51 | 0.02 | 0.08 | 0 | 0.09 | 955 | 32 | 17 | 0.4 |
| 250 | 58.19 | 17.2 | 7.06 | 16.29 | 0.99 | 0.02 | 0.12 | 0 | 0.1 | 1053 | 33.1 | 116 | 0.1 |
| 251 | 58.19 | 17.2 | 7.06 | 16.29 | 0.99 | 0.02 | 0.12 | 0 | 0.1 | 993 | 46.8 | 116 | 0.1 |
| 252 | 64.53 | 13.9 | 7.08 | 13.76 | 0.51 | 0.02 | 0.08 | 0 | 0.09 | 948 | 33.9 | 17 | 0.4 |
| 253 | 64.53 | 13.9 | 7.08 | 13.76 | 0.51 | 0.02 | 0.08 | 0 | 0.09 | 967 | 33.8 | 17 | 0.4 |
| 254 | 63.31 | 14.01 | 7.11 | 14.87 | 0.51 | 0.01 | 0.06 | 0 | 0.1 | 986 | 29.7 | 37 | 1.4 |
| 255 | 64.43 | 14.01 | 7.12 | 13.7 | 0.51 | 0.02 | 0.08 | 0 | 0.09 | 971 | 34.1 | 18 | 0.2 |
| 256 | 64.43 | 14.01 | 7.12 | 13.7 | 0.51 | 0.02 | 0.08 | 0 | 0.09 | 957 | 32.1 | 18 | 0.2 |
| 257 | 59.99 | 16.27 | 7.13 | 15.87 | 0.51 | 0.02 | 0.08 | 0 | 0.1 | 1081 | 35.4 | 113 | 0.1 |
| 258 | 59.99 | 16.27 | 7.13 | 15.87 | 0.51 | 0.02 | 0.08 | 0 | 0.1 | 1091 | 38.6 | 113 | 0.1 |
| 259 | 57.88 | 17.24 | 7.21 | 16.91 | 0.51 | 0.02 | 0.08 | 0 | 0.1 | 1155 | 33.4 | 153 | 0.2 |
| 260 | 57.88 | 17.24 | 7.21 | 16.91 | 0.51 | 0.02 | 0.08 | 0 | 0.1 | 1166 | 35.8 | 153 | 0.2 |
| 261 | 56.23 | 17.64 | 8.05 | 16.78 | 0.99 | 0.05 | 0.14 | 0 | 0.1 | 1100 | 32.1 | 108 | 0.1 |
| 262 | 56.23 | 17.64 | 8.05 | 16.78 | 0.99 | 0.05 | 0.14 | 0 | 0.1 | 1048 | 31.8 | 108 | 0.1 |
| 263 | 69.74 | 8.5 | 0 | 13.7 | 0.63 | 6.24 | 0.98 | 0 | 0.18 | 1007 | 33.7 | 112 | 0.6 |
| 264 | 69.8 | 8.48 | 0 | 14.66 | 1.1 | 5.28 | 0.48 | 0 | 0.18 | 935 | 30.2 | 92 | 2 |
| 265 | 69.85 | 8.49 | 0 | 13.68 | 1.6 | 6.1 | 0.06 | 0 | 0.18 | 994 | 40.2 | 54 | 0.7 |
| 266 | 68.76 | 8.51 | 0 | 14.65 | 1.12 | 6.29 | 0.48 | 0 | 0.18 | 940 | 39.9 | 99 | 1 |
| 267 | 69.72 | 8.46 | 0 | 14.16 | 1.11 | 6.27 | 0.07 | 0 | 0.18 | 973 | 30.5 | 92 | 0.5 |
| 268 | 69.27 | 8.49 | 0 | 13.69 | 1.12 | 6.24 | 0.98 | 0 | 0.18 | 964 | 37.2 | 81 | 0.1 |
| 269 | 70.72 | 7.49 | 0 | 13.68 | 1.12 | 6.29 | 0.49 | 0 | 0.18 | 875 | 39.8 | 56 | 1 |
| 270 | 69.62 | 8.66 | 0 | 14.4 | 0.7 | 6.33 | 0.06 | 0 | 0.2 | 960 | 38.9 | 127 | 0.1 |
| 271 | 70.24 | 8.48 | 0 | 13.66 | 1.11 | 6.23 | 0.06 | 0 | 0.18 | 954 | 42.2 | 85 | 0.1 |
| 272 | 70.64 | 9.02 | 0 | 13.03 | 1.9 | 5.15 | 0.05 | 0 | 0.19 | 884 | 52.9 | 33 | 0.8 |
| 273 | 70.8 | 8.49 | 0 | 13.65 | 1.09 | 5.28 | 0.48 | 0 | 0.18 | 921 | 42 | 77 | 1 |
| 274 | 69.84 | 9.46 | 0 | 13.66 | 1.11 | 5.23 | 0.48 | 0 | 0.18 | 996 | 41.9 | 102 | 0.1 |
| 275 | 69.61 | 8.56 | 0 | 13.9 | 1.16 | 6.08 | 0.47 | 0 | 0.19 | 977 | 37.4 | 85 | 0.4 |
| 276 | 67.48 | 9.21 | 0 | 14.5 | 1.46 | 6.29 | 0.88 | 0 | 0.18 | 942 | 36.6 | 93 | 0.5 |
| 277 | 69.85 | 7.47 | 0 | 13.64 | 1.12 | 7.23 | 0.48 | 0 | 0.17 | 928 | 37.4 | 63 | 0.1 |
| 278 | 68.69 | 8.48 | 0 | 13.66 | 2.07 | 6.41 | 0.48 | 0 | 0.18 | 907 | 44.4 | 26 | 0.8 |
| 279 | 70.8 | 8.03 | 0 | 13.96 | 0.96 | 6 | 0.05 | 0 | 0.2 | 906 | 43 | 85 | 0.9 |
| 280 | 69.88 | 8.48 | 0 | 13.66 | 2.07 | 5.21 | 0.49 | 0 | 0.18 | 972 | 40.6 | 16 | 2 |
| 281 | 70.55 | 9.05 | 0 | 14.04 | 0.97 | 5.14 | 0.05 | 0 | 0.19 | 919 | 46.6 | 106 | 0.8 |
| 282 | 68.79 | 8.83 | 0 | 13.94 | 1.36 | 6.01 | 0.88 | 0 | 0.18 | 903 | 36.6 | 78 | 0.5 |
| 283 | 50.7 | 25.5 | 0 | 23.7 | 0.01 | 0.02 | 0.06 | 0 | 0.01 | 1591 | 70.4 | 721 | −1.82 |
| 284 | 64.09 | 14.61 | 4.15 | 13.61 | 0.21 | 3.2 | .03 | 0 | .07 | 985.4 | 36.6 | 162 | −3.99 |
| 285 | 69.01 | 10.86 | 0 | 14.63 | 0.01 | 5.26 | 0.05 | 0 | 0.16 | 1087.6 | 50 | 224.931 | −1.53 |
| 286 | 68.89 | 10.7 | 0 | 14.73 | 0.01 | 5.09 | 0.05 | 0.37 | 0.16 | 1113.5 | 50 | 220.778 | −1.1 |
| 287 | 68.71 | 10.66 | 0 | 14.83 | 0.01 | 4.91 | 0.04 | 0.65 | 0.16 | 1123.5 | 50 | 219.715 | −0.77 |
| 288 | 68.73 | 10.66 | 0 | 14.84 | 0.01 | 4.63 | 0.04 | 0.91 | 0.16 | 1113.4 | 50 | 217.603 | −0.48 |
| 289 | 68.75 | 10.63 | 0 | 14.9 | 0.01 | 4.37 | 0.04 | 1.13 | 0.16 | 1107 | 50 | 215.62 | −0.13 |
| 290 | 68.86 | 10.65 | 0 | 14.74 | 0.01 | 4.15 | 0.04 | 1.37 | 0.16 | 1117.8 | 50 | 211.884 | −0.09 |
| 291 | 68.98 | 10.66 | 0 | 14.71 | 0.01 | 3.64 | 0.04 | 1.79 | 0.16 | 1114.9 | 50 | 207.556 | 0.38 |
| 292 | 67.32 | 12.65 | 3.76 | 13.76 | 0.01 | 2.37 | 0.04 | 0 | 0.07 | 971.9 | 50 | 128.466 | −1.29 |
| 293 | 66.96 | 12.63 | 3.96 | 13.84 | 0.01 | 2.47 | 0.04 | 0 | 0.08 | 970.3 | 50 | 124.242 | −1.29 |
| 294 | 67.43 | 12.56 | 3.93 | 13.54 | 0.01 | 2.41 | 0.03 | 0 | 0.07 | 962.8 | 50 | 117.959 | −1.45 |
| 295 | 67.09 | 12.66 | 4.15 | 13.64 | 0.01 | 2.33 | 0.04 | 0 | 0.07 | 947.1 | 50 | 115.348 | −1.38 |
| 296 | 67.45 | 12.46 | 4.07 | 13.5 | 0.01 | 2.38 | 0.03 | 0 | 0.08 | 940.8 | 50 | 110.364 | −1.36 |
| 297 | 67.11 | 12.57 | 4.12 | 13.64 | 0.01 | 2.42 | 0.04 | 0 | 0.08 | 953 | 50 | 114.499 | −1.38 |
| 298 | 68.95 | 10.65 | 0 | 14.74 | 0.01 | 3.49 | 0.05 | 1.93 | 0.17 | | | 206.619 | 0.56 |
| 299 | 68.62 | 10.76 | 0 | 14.91 | 0.01 | 3.53 | 0.04 | 1.94 | 0.16 | | | 212.495 | 0.59 |
| 300 | 68.21 | 10.92 | 0 | 15.09 | 0.01 | 3.57 | 0.04 | 1.98 | 0.17 | | | 219.963 | 0.57 |
| 301 | 68.12 | 11.18 | 0 | 15.01 | 0.01 | 3.52 | 0.04 | 1.94 | 0.16 | | | 225.356 | 0.28 |
| 302 | 68.34 | 10.84 | 0 | 14.87 | 0.01 | 3.47 | 0.04 | 2.25 | 0.16 | | | 213.553 | 0.53 |
| 303 | 68.71 | 10.71 | 0 | 14.79 | 0.01 | 3.2 | 0.04 | 2.37 | 0.16 | | | 206.595 | 0.85 |
| 304 | 68.29 | 11 | 0 | 15.09 | 0.01 | 3 | 0.04 | 2.39 | 0.16 | | | 217.514 | 1.06 |

TABLE 1-continued

Exemplary compositions of aluminosilicate glasses, expressed in mol %.

| Example | SiO$_2$ | Al$_2$O$_3$ | B$_2$O$_3$ | Na$_2$O | K$_2$O | MgO | CaO | ZnO | SnO$_2$ | CS (MPa) | DOL (μm) | CS criterion | Compensation criterion |
|---|---|---|---|---|---|---|---|---|---|---|---|---|---|
| 305 | 67.94 | 11.05 | 0 | 15.25 | 0.01 | 3.05 | 0.03 | 2.48 | 0.16 | | | 221.689 | 1.13 |
| 306 | 67.93 | 11.01 | 0 | 15.28 | 0.01 | 3.26 | 0.04 | 2.29 | 0.16 | | | 222.855 | 0.98 |

While typical embodiments have been set forth for the purpose of illustration, the foregoing description should not be deemed to be a limitation on the scope of the disclosure or appended claims. Accordingly, various modifications, adaptations, and alternatives may occur to one skilled in the art without departing from the spirit and scope of the present disclosure or appended claims.

The invention claimed is:

1. A glass article having a surface and a layer under compressive stress extending from the surface to a depth of layer wherein the compressive stress CS is at least about 900 Mpa and the depth of layer DOL is at least about 30 μm, wherein the glass article comprises:
at least about 50 mol % SiO$_2$;
from about 7 mol % to about 26 mol % Al$_2$O$_3$;
from about 11 mol % to about 25 mol % Na$_2$O;
from 0 mol % to about 9 mol % B$_2$O$_3$;
from 0 mol % to 2.5 mol % K$_2$O;
from 0 mol % to about 8.5 mol % MgO; and
from 0 mol % to 1.5 mol % CaO;
wherein the glass article exhibits a CS criterion defined by the equation $-340+27.1*Al_2O_3-28.7*B_2O_3+15.6*Na_2O-61.4*K_2O+8.1*(MgO+ZnO) \geq 40$ mol % and a compensation criterion defined by the equation $0.7$ mol % $\leq Na_2O+K_2O-Al_2O_3-MgO-ZnO \leq 2$ mol %.

2. The glass article of claim 1, wherein the compensation criterion is 1.0 mol % $\leq Na_2O+K_2O-Al_2O_3-MgO-ZnO \leq 2$ mol %.

3. The glass article of claim 1, wherein the CS criterion defined by the equation $-340+27.1*Al_2O_3-28.7*B_2O_3+15.6*Na_2O-61.4*K_2O+8.1*(MgO+ZnO) \geq 80$ mol %.

4. The glass article of claim 3, wherein the CS criterion defined by the equation $-340+27.1*Al_2O_3-28.7*B_2O_3+15.6*Na_2O-61.4*K_2O+8.1*(MgO+ZnO) \geq 100$ mol %.

5. The glass article of claim 1, wherein the glass article further comprises 0-0.1 mol % of one or more of ZrO$_2$, TiO$_2$, Fe$_2$O$_3$, Cr$_2$O$_3$, Co2O$_3$, or V$_2$O$_3$.

6. The glass article of claim 1, wherein the glass article is substantially free of Li$_2$O.

7. The glass article of claim 1, wherein the glass article further comprises at least one fining agent selected from the group consisting of F, Cl, Br, I, As$_2$O$_3$, Sb$_2$O$_3$, CeO$_2$, SnO$_2$, and combinations thereof.

8. The glass article of claim 1, wherein the glass article has a thickness of up to about 1 mm.

9. The glass article of claim 1, wherein the glass article exhibits a load to failure of at least about 300 kgf.

10. The glass article of claim 1, wherein the DOL is at least about 40 μm.

11. The glass article of claim 1, wherein the CS is at least 1000 MPa.

12. The glass article of claim 1, wherein SiO$_2$+Al$_2$O$_3$+B$_2$O$_3$+Na$_2$O+K$_2$O+MgO+ZnO $\geq 95$ mol %.

13. The glass article of claim 1, wherein Na$_2$O+Al$_2$O$_3$+MgO+ZnO>25 mol %.

14. The glass article of claim 1, wherein the glass comprises greater than 0 to 8.5 mol % MgO.

15. The glass article of claim 1, wherein the glass comprises 0-0.1 mol % ZrO2.

* * * * *